United States Patent
Hsu et al.

(10) Patent No.: US 9,691,382 B2
(45) Date of Patent: Jun. 27, 2017

(54) VOICE CONTROL DEVICE AND METHOD FOR DECIDING RESPONSE OF VOICE CONTROL ACCORDING TO RECOGNIZED SPEECH COMMAND AND DETECTION OUTPUT DERIVED FROM PROCESSING SENSOR DATA

(71) Applicant: MEDIATEK INC., Hsin-Chu (TW)

(72) Inventors: Chao-Ling Hsu, Hsinchu (TW);
Yiou-Wen Cheng, Hsinchu (TW);
Xin-Wei Shih, Changhua County (TW);
Jyh-Horng Lin, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 259 days.

(21) Appl. No.: 14/078,551

(22) Filed: Nov. 13, 2013

(65) Prior Publication Data

US 2014/0249820 A1  Sep. 4, 2014

Related U.S. Application Data

(60) Provisional application No. 61/771,092, filed on Mar. 1, 2013.

(51) Int. Cl.
*G10L 15/22* (2006.01)
*G06F 3/01* (2006.01)

(52) U.S. Cl.
CPC ............... *G10L 15/22* (2013.01); *G06F 3/017* (2013.01); *G10L 2015/223* (2013.01)

(58) Field of Classification Search
CPC .... G06F 3/017; G10L 15/22; G10L 2015/223
(Continued)

(56) References Cited

U.S. PATENT DOCUMENTS 5,142,585 A * 8/1992 Taylor .................. G10L 15/065
381/94.2
8,321,219 B2 11/2012 Mozer
(Continued)

FOREIGN PATENT DOCUMENTS

CN  1287657 A  3/2001
CN  1969250 A  5/2007
(Continued)

OTHER PUBLICATIONS

Yi Min, voice controlled technology for mobile phone, family electronics, No. 4, Apr. 1, 2002, p. 15.

*Primary Examiner* — Michael N Opsasnick
(74) *Attorney, Agent, or Firm* — Winston Hsu

(57) ABSTRACT

A voice control device has a speech command recognizer, a sensor data processor and a decision making circuit. The speech command recognizer is arranged for performing speech command recognition to output a recognized speech command. The sensor data processor is arranged for processing sensor data generated from at least one auxiliary sensor to generate a detection output. The decision making circuit is arranged for deciding a response of the voice control device according to the recognized speech command and the detection output. The same speech command is able to trigger difference responses according to the detection output (e.g., detected motion). Besides, an adaptive training process may be employed to improve the accuracy of the sensor data processor. Hence, the voice control device may have improved performance of the voice control feature due to a reduce occurrence probability of miss errors and false alarm errors.

15 Claims, 9 Drawing Sheets

(58) Field of Classification Search
USPC .......................................................... 704/251
See application file for complete search history.

(56) References Cited

U.S. PATENT DOCUMENTS

| | | | |
|---|---|---|---|
| 9,142,217 B2* | 9/2015 | Miglietta | G10L 15/26 |
| 2003/0009261 A1* | 1/2003 | Parker | G06N 3/008 |
| | | | 700/258 |
| 2004/0183749 A1* | 9/2004 | Vertegaal | G06F 3/011 |
| | | | 345/7 |
| 2005/0210417 A1* | 9/2005 | Marvit | G06F 1/1613 |
| | | | 715/863 |
| 2005/0216867 A1* | 9/2005 | Marvit | G06F 1/1613 |
| | | | 715/863 |
| 2006/0093998 A1* | 5/2006 | Vertegaal | G06F 3/011 |
| | | | 434/236 |
| 2009/0055180 A1* | 2/2009 | Coon | B60R 16/0373 |
| | | | 704/251 |
| 2009/0060170 A1* | 3/2009 | Coughlan | H04M 1/605 |
| | | | 379/433.02 |
| 2010/0121227 A1* | 5/2010 | Stirling | A61B 5/1127 |
| | | | 600/595 |
| 2010/0153321 A1* | 6/2010 | Savvides | G06F 17/271 |
| | | | 706/13 |
| 2012/0226498 A1 | 9/2012 | Kwan | |

FOREIGN PATENT DOCUMENTS

| | | |
|---|---|---|
| CN | 201037946 Y | 3/2008 |
| CN | 101334671 A | 12/2008 |
| CN | 101557432 A | 10/2009 |
| CN | 101646990 A | 2/2010 |
| CN | 101840700 A | 9/2010 |
| CN | 102087712 A | 6/2011 |
| CN | 102428440 A | 4/2012 |
| JP | 2003216182 A | 7/2003 |

* cited by examiner

VOICE CONTROL DEVICE AND METHOD FOR DECIDING RESPONSE OF VOICE CONTROL ACCORDING TO RECOGNIZED SPEECH COMMAND AND DETECTION OUTPUT DERIVED FROM PROCESSING SENSOR DATA

CROSS REFERENCE TO RELATED APPLICATIONS

This application claims the benefit of U.S. provisional application No. 61/771,092, filed on Mar. 1, 2013 and incorporated herein by reference.

BACKGROUND

The disclosed embodiments of the present invention relate to a voice control scheme, and more particularly, to a voice control device and method for deciding a response of voice control according to a recognized speech command and a detection output which is derived from processing sensor data.

Speech command recognition is a technique for detecting whether a user speech input includes a certain command defined in a command set, and may be employed by a voice control application. However, the critical problem of a voice control function is the performance degradation in a noisy environment. For example, when there is a user's speech command but the voice control function does not recognize any speech command due to the noisy environment, amiss error occurs; and when there is no user's speech command but the voice control function falsely recognizes one speech command due to the noisy environment, a false alarm error occurs. As a result, the user may have poor experience of using the voice control function equipped on an electronic device (e.g., a mobile phone).

SUMMARY

In accordance with exemplary embodiments of the present invention, a voice control device and method for deciding a response of voice control according to a recognized speech command and a detection output which is derived from processing sensor data are proposed to solve the above-mentioned problem.

According to a first aspect of the present invention, an exemplary voice control device is disclosed. The exemplary voice control device includes a speech command recognizer, a sensor data processor and a decision making circuit. The speech command recognizer is arranged for performing speech command recognition to output a recognized speech command. The sensor data processor is arranged for processing sensor data generated from at least one auxiliary sensor to generate a detection output. The decision making circuit is arranged for deciding a response of the voice control device according to the recognized speech command and the detection output.

According to a second aspect of the present invention, an exemplary voice control method is disclosed. The exemplary voice control method includes at least the following steps: performing speech command recognition to output a recognized speech command; processing sensor data generated from at least one auxiliary sensor to generate a detection output ; and referring to the recognized speech command and the detection output to decide a response of voice control.

According to a third aspect of the present invention, an exemplary machine readable medium which stores a program code is disclosed. When the program code is executed by a processor, the program code instructs the processor to perform following steps: performing speech command recognition to output a recognized speech command; processing sensor data generated from at least one auxiliary sensor to generate a detection output ; and referring to the recognized speech command and the detection output to decide a response of voice control.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The main concept of the present invention is to use information given from auxiliary sensor(s) to decide a response of voice control for one recognized speech command. In other words, the response of voice control is decided by jointly referring to the recognized speech command and a detection output which is derived from processing sensor data. In this way, the same speech command may be able to trigger different actions under different detection outputs (e.g., different detected motions). Besides, an adaptive training process may be employed to improve the accuracy of processing the sensor data. The proposed voice control device therefore would have improved performance of the voice control feature due to a reduced occurrence probability of miss errors and false alarm errors. Further details of the present invention will be described with reference to the accompanying drawings.

Figure 1:
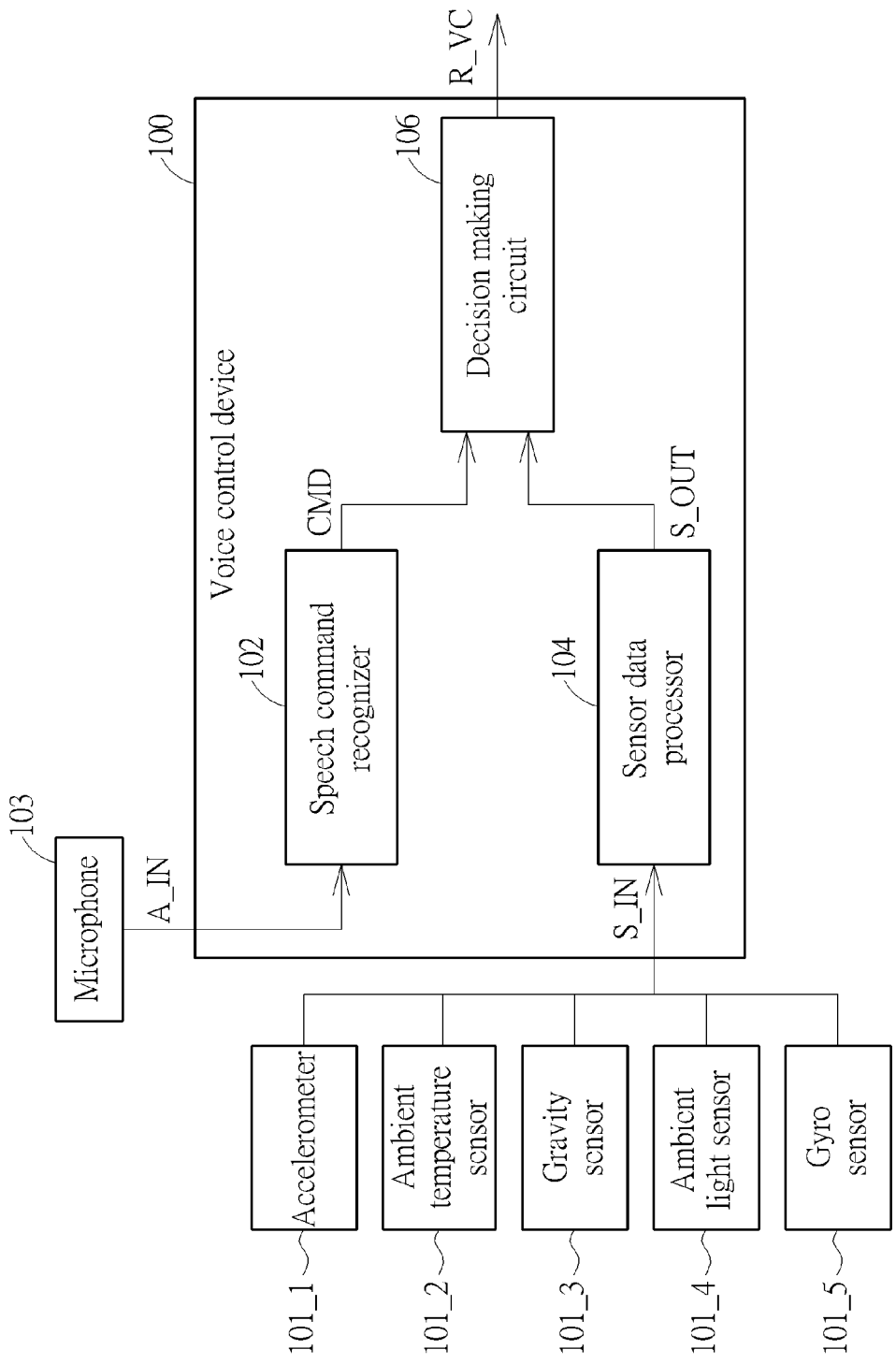
FIG. 1 is a block diagram illustrating a voice control device according to an embodiment of the present invention.

Please refer to FIG. 1, which is a block diagram illustrating a voice control device according to an embodiment of the present invention. The voice control device 100 includes a speech command recognizer 102, a sensor data processor 104, and a decision making circuit 106. The speech command recognizer 102 is arranged for receiving a speech input A_IN from a voice input device such as a microphone 103, and performing speech command recognition upon the speech input A_IN. In a case where the speech input A_IN carries valid command information, the speech command recognizer 102 is capable of deriving a recognized speech command CMD from the speech input A_IN. In this embodiment, the speech command recognizer 102 recognizes and outputs the recognized speech command CMD to the decision making circuit 106 such that the recognized speech command CMD does not serve as an output of the voice control device 100 directly. The sensor data processor 104 is arranged for processing sensor data S_IN generated from at least one auxiliary sensor to generate a detection output S_OUT to the decision making circuit 106. For example, the sensor data S_IN may be provided by at least one of an accelerometer 101_1, an ambient temperature sensor 101_2, a gravity sensor 101_3, an ambient light sensor 101_4, and a Gyro sensor 101_5. The decision making circuit 106 is coupled to the speech command recognizer 102 and the sensor data processor 104, and arranged for deciding a response R_VC of the voice control device 100 according to the recognized speech command CMD and the detection output S_OUT, where the response R_VC may be a control command of other circuit element(s). Hence, the response R_VC for the recognized speech command CMD may be adjusted based on the detection output S_OUT. In this way, the response R_VC may be a command identical to or different from the recognized speech command CMD. Further details of the proposed voice control device 100 are described as below.

Figure 2:
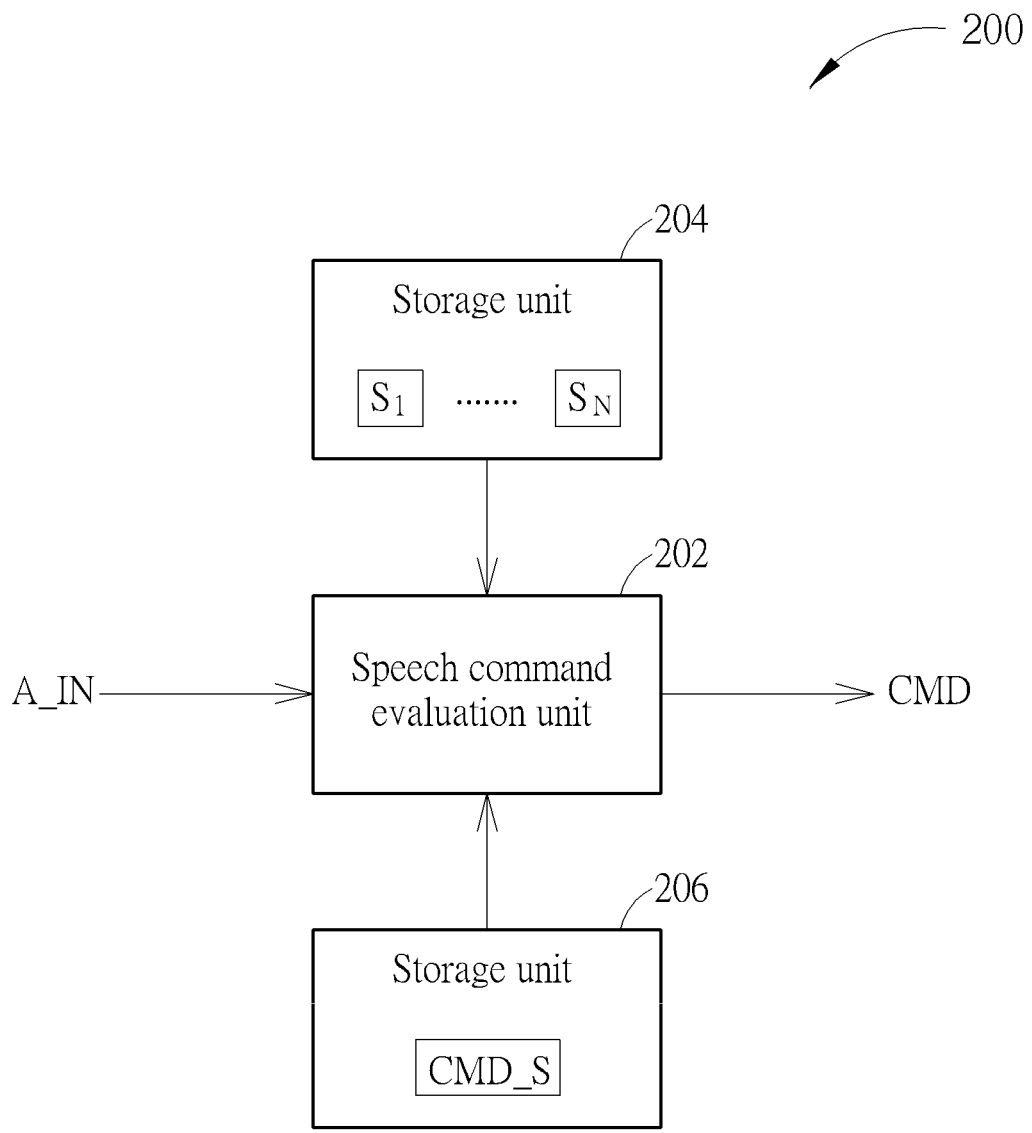
FIG. 2 is a block diagram illustrating a speech command recognizer according to an embodiment of the present invention.

FIG. 2 is a block diagram illustrating a speech command recognizer according to an embodiment of the present invention. The speech command recognizer 102 shown in FIG. 1 may be implemented using the speech command recognizer 200 shown in FIG. 2. In this embodiment, the speech command recognizer 200 includes a speech command evaluation unit 202 and a plurality of storage units 204, 206. By way of example, but not limitation, the storage units 204, 206 may be allocated in the same storage device such as a non-volatile memory device. The storage unit 204 is used to store a plurality of predefined speech models $S_1$-$S_N$. The storage unit 206 is used to store a predefined command set CMD_S which is consistently used during the speech command recognition performed by the speech command recognizer 200 (i.e., the speech command recognizer 200 does not need to switch between different command sets), where the predefined command set CMD_S is composed of a plurality of predefined commands each supported by an electronic device (e.g., a mobile device) that uses the proposed voice control device.

Specifically, each of the predefined speech models $S_1$-$S_N$ defines a basic unit of speech, such as a phoneme. Therefore, one phoneme may be combined with other phonemes to describe a speech command. In other words, each of the predefined commands in the predefined command set CMD_S is formed by one or more of the phonemes defined by the predefined speech models $S_1$-$S_N$. The predefined speech models $S_1$-$S_N$ may be created via a training speech input beforehand. The speech command evaluation unit 202 receives the speech input A_IN, analyzes the speech input A_IN based on the predefined speech models $S_1$-$S_N$ to thereby generate an analysis result, and determines the recognized speech command CMD according to the predefined command set CMD_S and the analysis result. For example, when the speech input A_IN is received, the speech command evaluation unit 202 determines phonemes of the speech input A_IN according to the predefined speech models $S_1$-$S_N$, and refers to the determined phonemes of the speech input A_IN to calculate a score for each of the predefined commands in the predefined command set CMD_S. When a score of a specific predefined command is higher, it means that the specific predefined command is more likely to be the speech command corresponding to the speech input A_IN. Hence, the speech command evaluation unit 202 may refer to scores of the predefined commands to determine one of the predefined commands as the recognized speech command CMD.

Figure 3:
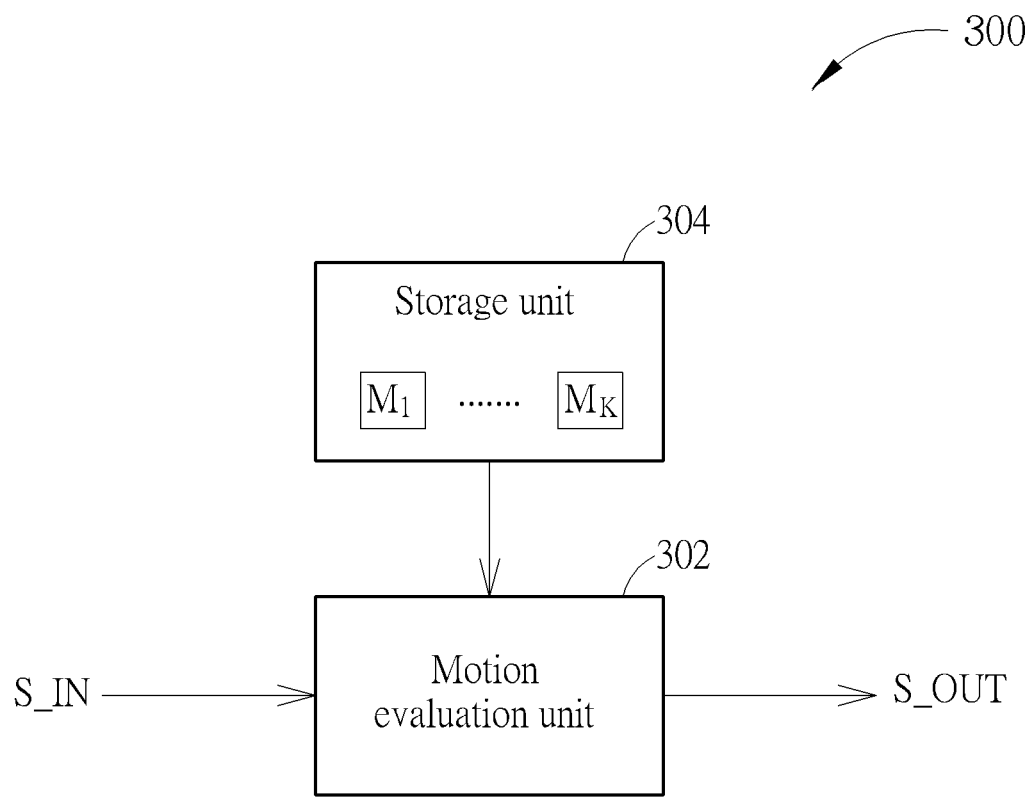
FIG. 3 is a block diagram illustrating a motion detector according to an embodiment of the present invention.

FIG. 3 is a block diagram illustrating a motion detector according to an embodiment of the present invention. The sensor data processor 104 shown in FIG. 1 may be implemented using the motion detector 300 shown in FIG. 3. In this embodiment, the motion detector 300 includes a motion evaluation unit 302 and a storage unit 304. By way of example, but not limitation, the storage unit 304 may be allocated in a non-volatile memory device. The storage unit 304 is arranged to store a plurality of predefined motion models $M_1$-$M_K$ each corresponding to one particular motion. The motion evaluation unit 302 receives the sensor data S_IN, analyzes the sensor data S_IN based on the predefined motion models $M_1$-$M_K$ to thereby generate an analysis result, and determines the detection output (i.e., a motion detection result) S_OUT according to the analysis result. For example, when the sensor data S_IN matches one of the predefined motion models $M_1$-MK, the corresponding motion is indicated by the detection output S_OUT. However, when the sensor data S_IN matches none of the predefined motion models $M_1$-$M_K$, the detection output S_OUT is indicative of no motion detected.

As mentioned above, the decision making circuit 106 decides the response R_VC of the voice control device 100 according to both of the recognized speech command CMD and the detection output S_OUT. Hence, considering a case where the sensor data processor 104 is implemented using the motion detector 300, the decision making circuit 106 would refer to the motion detection result (which may indicate a detected motion or no motion detected) to decide the response R_VC for the recognized speech command CMD. For better understanding of technical features of the proposed voice control scheme, several operational scenarios of a mobile device employing the proposed voice control scheme are given as below.

Figure 4:
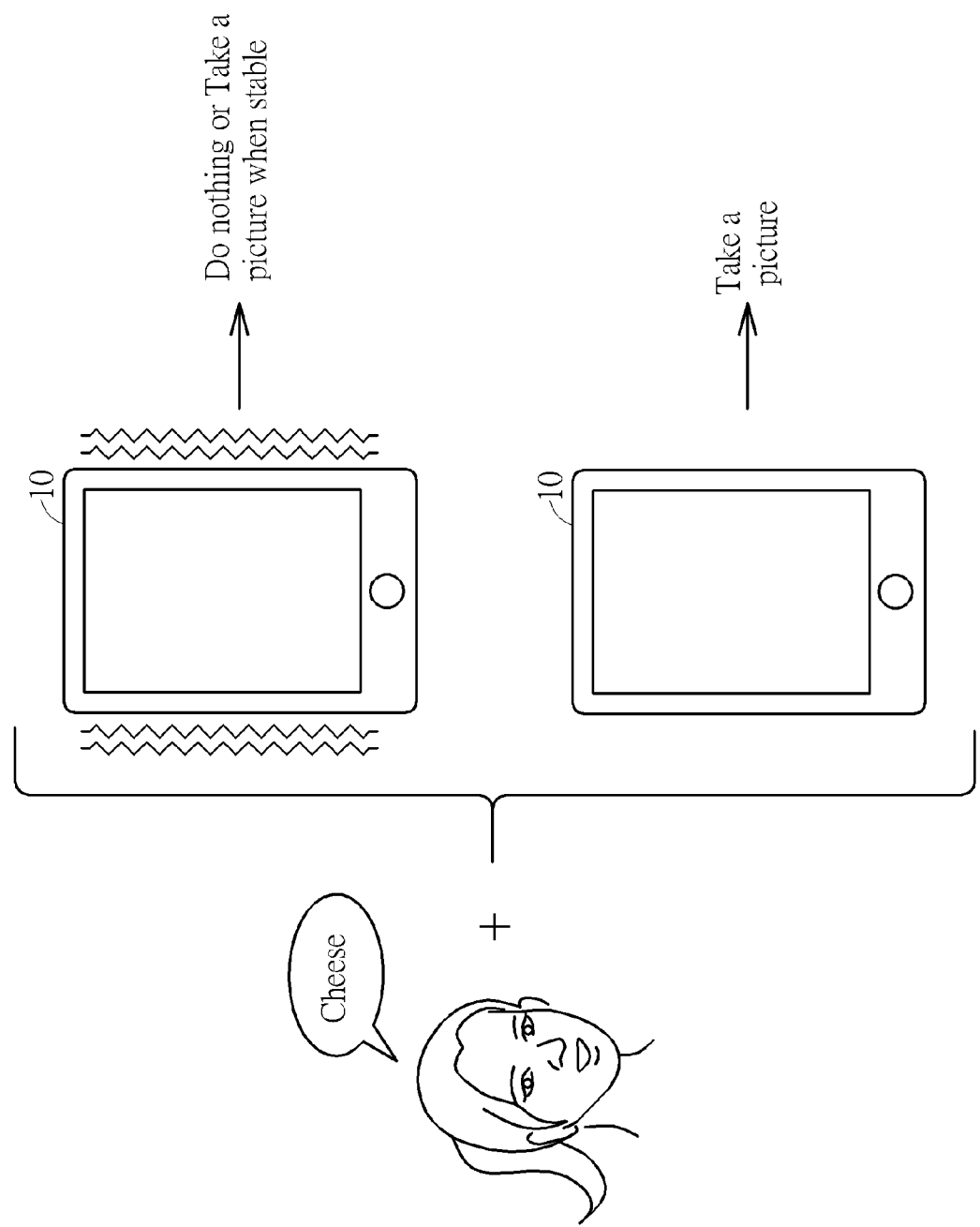
FIG. 4 is a diagram illustrating a first operational scenario of a mobile device according to an embodiment of the present invention.

FIG. 4 is a diagram illustrating a first operational scenario of a mobile device according to an embodiment of the present invention. By way of example, the mobile device 10 is a mobile phone with the voice control device 100 implemented therein, and supports a "voice control camera" function. When the decision making circuit 106 receives a recognized speech command "Cheese" defined for triggering a camera module to take a picture and a detection output S_OUT indicating that the mobile device 10 is unstable, the decision making circuit 106 decides that the recognized speech command "Cheese" is a false alarm resulting from the noisy environment, and does not output the recognized speech command "Cheese" as the response R_VC of the voice control device 100. In this way, no blurry picture is taken by the voice control camera when the mobile device 10 is found unstable.

In an alternative design, when the decision making circuit 106 receives a recognized speech command "Cheese" defined for triggering a camera module to take a picture and the detection output S_OUT indicating that the mobile device 10 is unstable, the decision making circuit 106 does not output the recognized speech command "Cheese" until the detection output S_OUT indicates that the mobile device 10 becomes stable later. More specifically, when receiving the recognized speech command "Cheese" under a condition that the mobile device 10 is unstable, the decision making circuit 106 delays the output of the recognized speech command "Cheese" to wait for the mobile device 10 to become stable. When the mobile device 10 becomes stable before a predetermined wait time is expired, the decision making circuit 106 outputs the recognized speech command "Cheese". In this way, the same objective of preventing a blurry picture from being taken by the voice control camera when the mobile device 10 is unstable is achieved. Besides, this also improves user experience of using a mobile device supporting a "voice control camera" function.

When the decision making circuit 106 receives a recognized speech command "Cheese" defined for triggering a camera module to take a picture and a detection output S_OUT indicating that the mobile device 10 is stable enough, the decision making circuit 106 decides that the recognized speech command "Cheese" is a valid command, and outputs the recognized speech command "Cheese" as the response R_VC of the voice control device 100. In this way, a clear picture is taken by the voice control camera when the mobile device 10 is found stable. Hence, with the assistance of the motion detection, the camera is triggered by the speech command "Cheese" only when the camera is stable enough.

Figure 5:
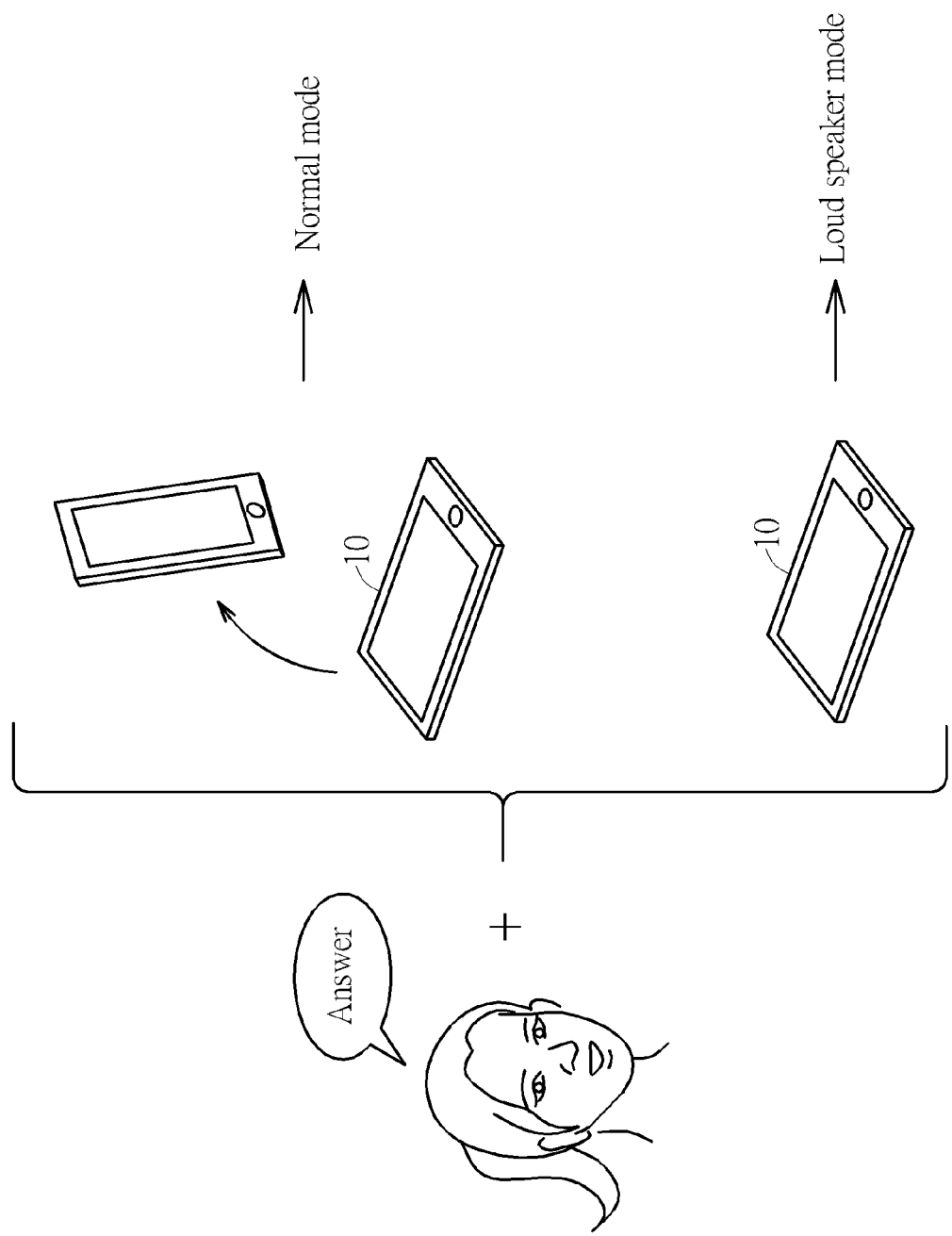
FIG. 5 is a diagram illustrating a second operational scenario of a mobile device according to an embodiment of the present invention.

FIG. 5 is a diagram illustrating a second operational scenario of a mobile device according to an embodiment of the present invention. In this example, the mobile device 10 supports a "voice control answering/rejecting phone" function. When the decision making circuit 106 receives a recognized speech command "Answer" defined for triggering an action of answering an incoming phone call and a detection output S_OUT indicating that the mobile device 10 has a "raise-to-head" motion, the decision making circuit 106 decides that the mobile device 10 is close to user's ear and should operate in a normal mode. When the decision making circuit 106 receives a recognized speech command "Answer" defined for triggering an action of answering an incoming phone call and a detection output S_OUT indicating that the mobile device 10 has no "raise-to-head" motion, the decision making circuit 106 decides that the mobile device 10 is not close to user's ear and should operate in a loud speaker mode (i.e., a hands-free mode).

Figure 6:
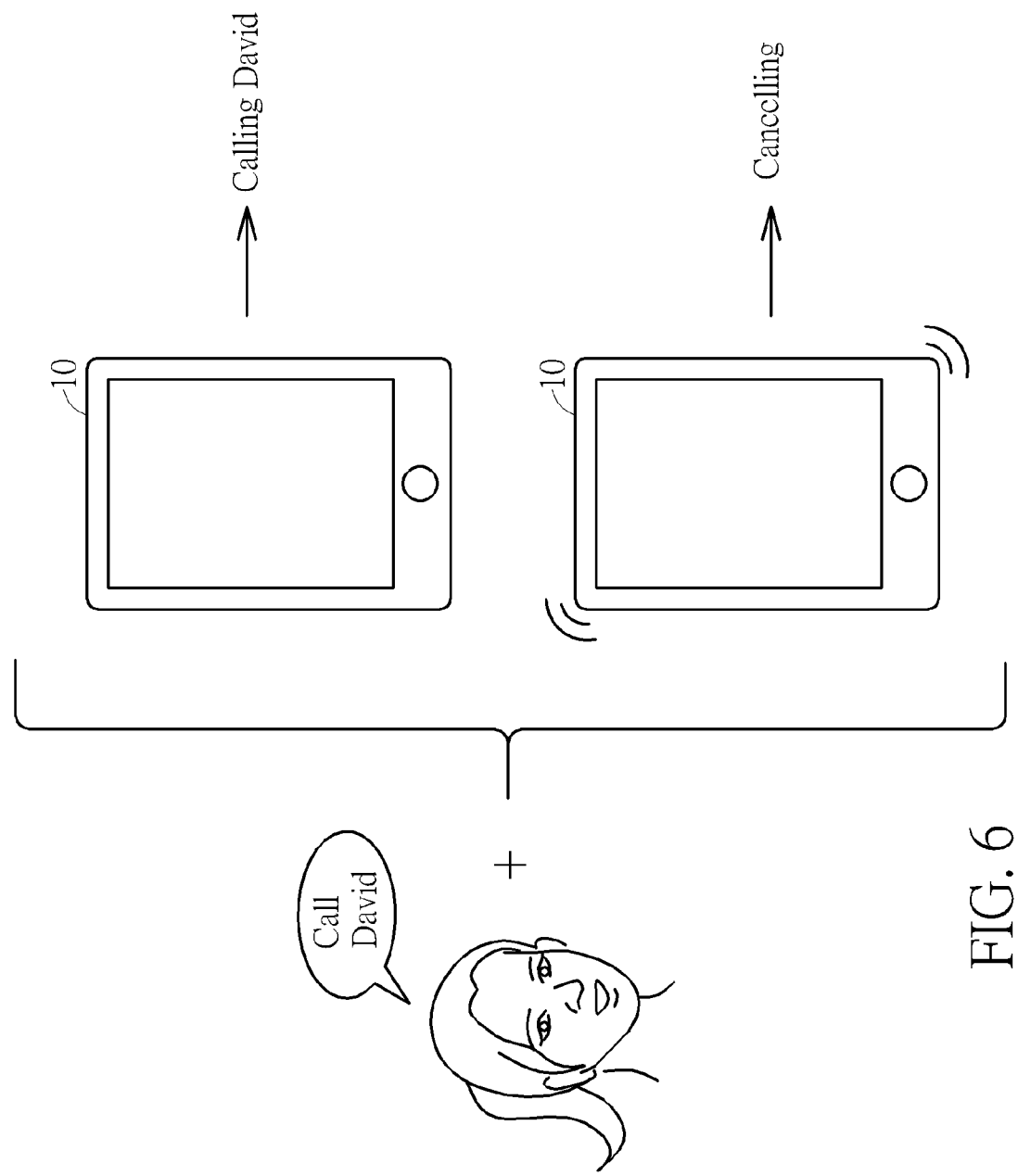
FIG. 6 is a diagram illustrating a third operational scenario of a mobile device according to an embodiment of the present invention.

FIG. 6 is a diagram illustrating a third operational scenario of a mobile device according to an embodiment of the present invention. In this example, the mobile device 10 supports a "voice control phone call" function. When the decision making circuit 106 receives a recognized speech command "Call David" defined for triggering an action of making a call to a contact person "David" and a detection output S_OUT indicating that the mobile device 10 does not have a "shaking" motion, the decision making circuit 106 decides that the action of making a call to the contact person "David" is confirmed by the user, and therefore outputs the recognized speech command "Call David" as the response R_VC to allow the mobile device 10 to generate an outgoing call with a designated phone number. When the decision making circuit 106 receives a recognized speech command "Call David" defined for triggering an action of making a call to a contact person "David" and a detection output S_OUT indicating that the mobile device 10 has a "shaking" motion, the decision making circuit 106 decides that the action of making a call to the contact person "David" is aborted by the user, and therefore sets the response R_VC to cancel the outgoing call procedure.

Figure 7:
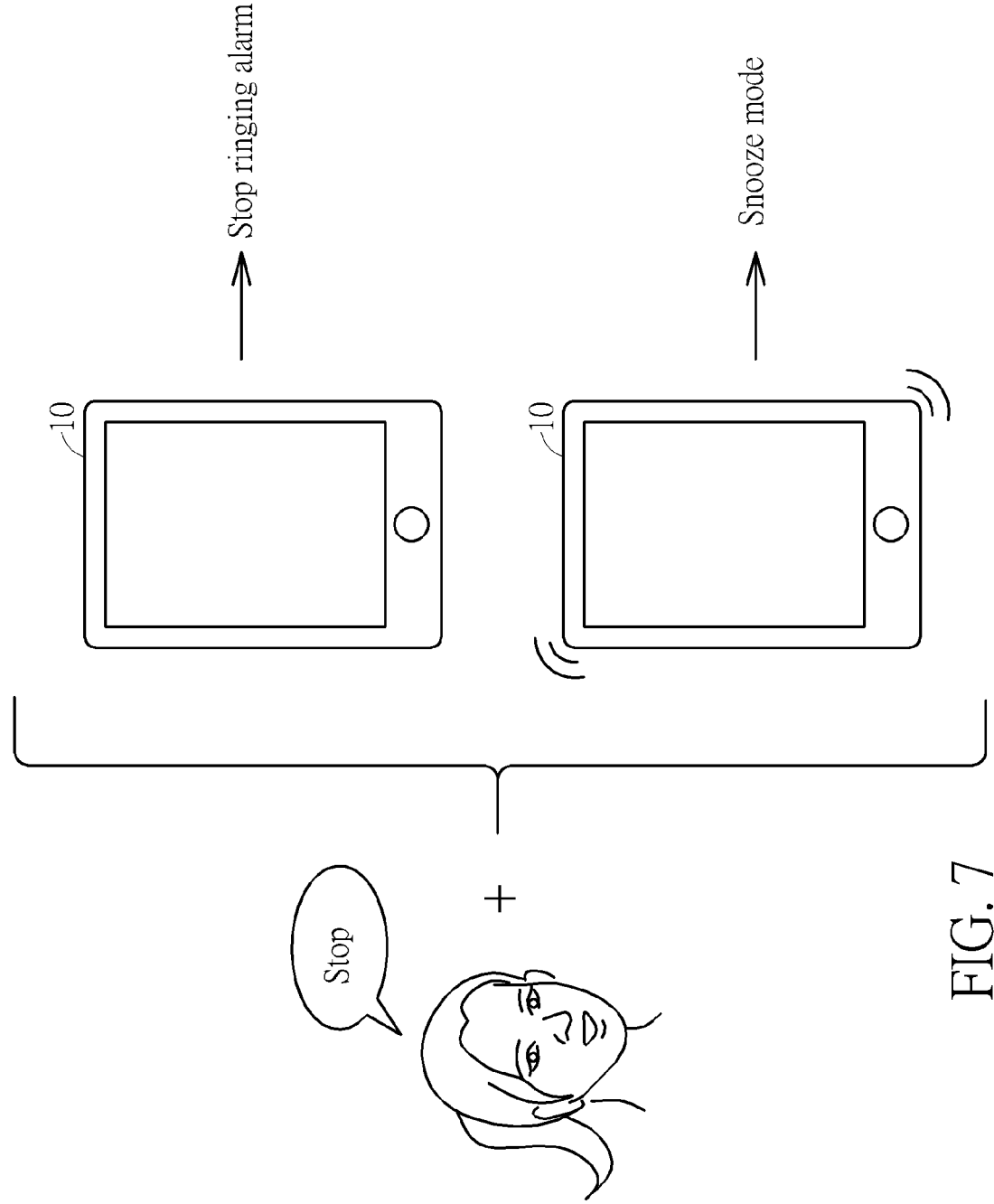
FIG. 7 is a diagram illustrating a fourth operational scenario of a mobile device according to an embodiment of the present invention.

FIG. 7 is a diagram illustrating a fourth operational scenario of a mobile device according to an embodiment of the present invention. In this example, the mobile device 10 supports a "voice control alarm" function. When the decision making circuit 106 receives a recognized speech command "Stop" defined for triggering an action of stopping a ringing alarm of the mobile device 10 and a detection output S_OUT indicating that the mobile device 10 does not have a "shaking" motion, the decision making circuit 106 outputs the recognized speech command "Stop" as the response R_VC of the voice control device 100, thus directly stopping the alarm from ringing.

When the decision making circuit 106 receives a recognized speech command "Stop" defined for triggering an action of stopping a ringing alarm of the mobile device 10 and a detection output S_OUT indicating that the mobile device 10 has a "shaking" motion, the decision making circuit 106 outputs the response R_VC to enable a snooze mode, where the shaking times maybe directly set as the snooze minutes. To put it simply, when the alarm rings, the same speech command can trigger different actions due to different motion statuses.

Figure 8:
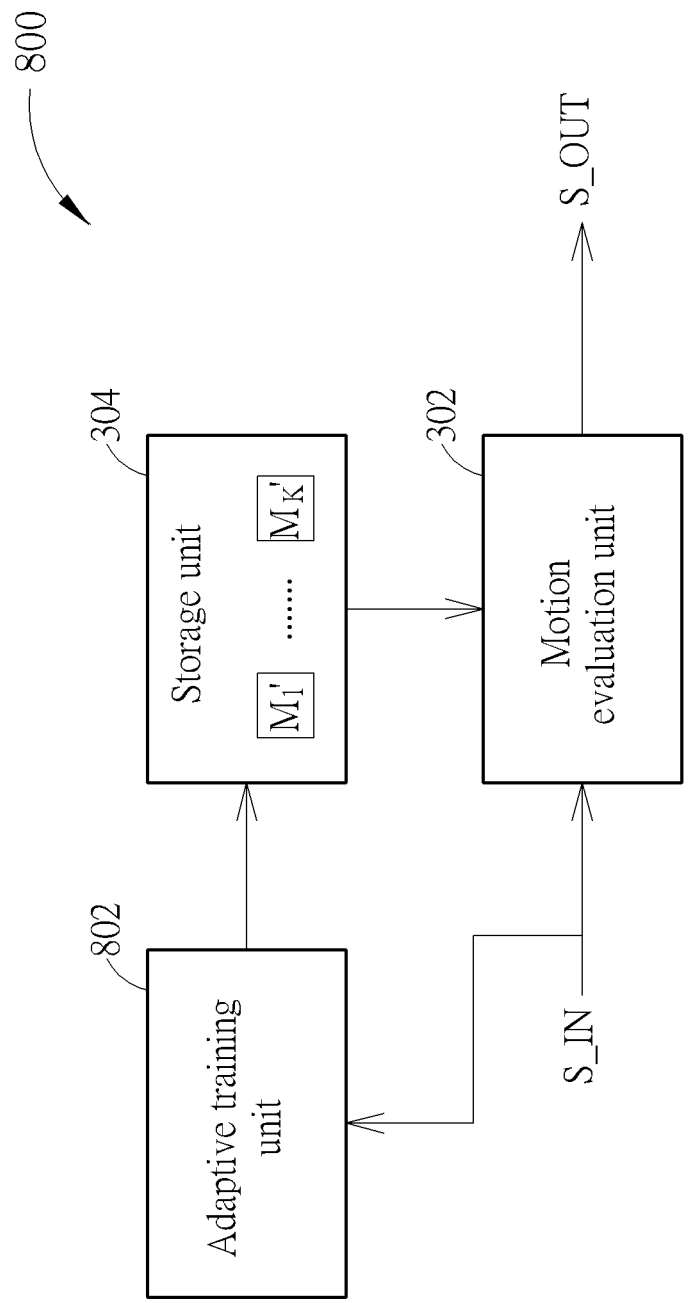
FIG. 8 is a block diagram illustrating a motion detector according to another embodiment of the present invention.

Different users have their own habits doing a motion, which creates variations of the motion. For example, when shaking a phone, different users have different ways to do it. As a result, the same motion model cannot cover different ways of doing a motion. Hence, to improve the accuracy of detecting motions performed by a specific user, the motion models should be properly configured according to user's habits of doing the motions. The present invention therefore proposes an adaptive motion training process. Please refer to FIG. 8, which is a block diagram illustrating a motion detector according to another embodiment of the present invention. The sensor data processor 104 shown in FIG. 1 may be implemented using the motion detector 800 shown in FIG. 8. The major difference between the motion detectors 300 and 800 is that an adaptive training unit 802 is implemented in the motion detector 800 in FIG. 8. In this embodiment, the adaptive training unit 802 is arranged to train/learn at least one motion model by an adaptive training process. For example, all motion models stored in the storage unit 304 are trained/learned motion models $M_1'$-$M_K'$ which are obtained based on user's input/feedback.

In one exemplary design, the adaptive training process is an explicit training process performed before the voice control device 100 is in normal operation. Therefore, the system may ask the user to do a specific motion several times, thus allowing the adaptive training unit 802 to learn a corresponding motion model. For example, regarding a "raise-to-head" motion, a display screen of a mobile device (e.g., a mobile phone) shows a message "Please raise the phone to your ear", and the adaptive training unit 802 trains/learns a "raise-to-head" motion model according to user's action of raising the phone to his/her ear. In this way, a more accurate "raise-to-head" motion model is estimated and stored in the storage unit 304 for following motion evaluation performed during the normal operation of the voice control device 100.

In another exemplary design, the adaptive training process is an implicit training process performed while the voice control device is in normal operation. In other words, motion data is collected while the user is using the voice control feature. For example, when a mobile phone with voice control capability informs the user of an incoming phone call, the user says a speech command "Answer" and makes the mobile phone have a "raise-to-head" motion in order to answer the incoming phone call. If the mobile phone enters a loud speaker mode rather than a normal mode, this means that the "raise-to-head" motion is not correctly recognized by the motion detection. It is possible that the "raise-to-head" motion is not properly set to meet user's preference of doing the "raise-to-head" motion. Since the loud speaker mode is not the correct mode expected by the user, the user may manipulate the mobile phone to switch from the loud speaker mode to the normal mode manually, which notifies the adaptive training unit 802 that an error occurs and is corrected by the user. The sensor data A_IN of the actual "raise-to-head" motion will be recorded for adaptive motion model training. In this way, the "raise-to-head" motion model is adaptively adjusted according to the "raise-to-head" motion actually made by the user. Thus, a more accurate "raise-to-head" motion model can be obtained through the implicit training process.

The motion detector is merely one exemplary implementation of the sensor data processor 104. In practice, the sensor data processor 104 is allowed to generate the detection output S_OUT based on any sensor input, depending upon actual design consideration/requirement. For example, the sensor data processor 104 may be a temperature detector. Hence, when a recognized speech command "App recommendation" is received and the temperature detector detects that the ambient temperature is higher than a threshold, the response R_VC of the voice control device 100 may instruct an operating system to select an application suitable for the current environment (e.g., an outdoor environment); and when the same recognized speech command "App recommendation" is received and the temperature detector detects that the ambient temperature is lower than the threshold, the response R_VC of the voice control device 100 may instruct the operating system to select another application suitable for the current environment (e.g., an indoor environment).

Figure 9:
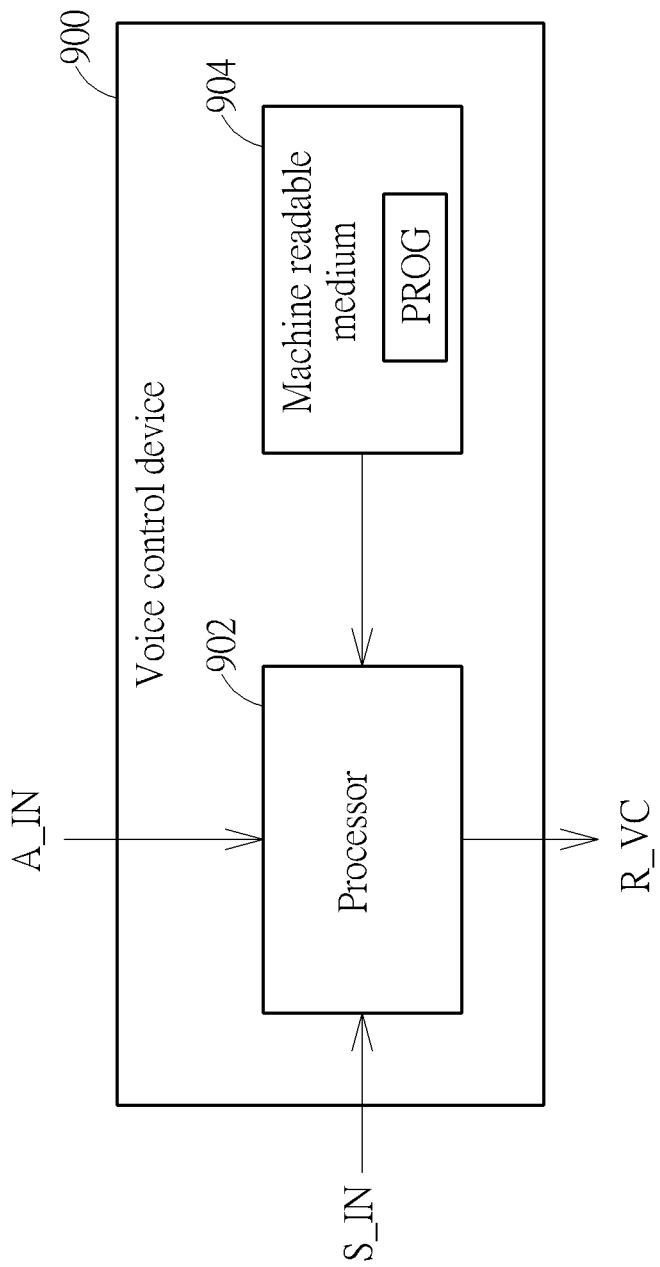
FIG. 9 is a block diagram illustrating a voice control device according to another embodiment of the present invention.

With regard to the voice control device 100 shown in FIG. 1, it is realized by a hardware-based design. However, using a software-based design to realize a voice control device is also feasible. Please refer to FIG. 9, which is a block diagram illustrating a voice control device according to another embodiment of the present invention. The voice control device 900 includes a processor 902 and a machine readable medium 904. By way of example, the processor 902 may be a micro control unit, and the machine readable medium 904 may be a non-volatile memory device. The machine readable medium 904 has a program code PROG stored therein. When the program code PROG is loaded and executed by the processor 902, the program code PROG instructs the processor 902 to perform operations of the aforementioned speech command recognizer 102, sensor data processor 104 and decision making circuit 106. As a person skilled in the art can readily understand details of the software-based voice control device 900 after reading above paragraphs directed to the hardware-based voice control device 100, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A voice control device, comprising:
    a speech command recognizer, arranged for performing speech command recognition to output a recognized speech command;
    a sensor data processor, arranged for processing sensor data generated from at least one auxiliary sensor to determine a motion of a mobile device comprising the voice control device, to generate a detection output; and
    a decision making circuit, arranged for deciding a response of the voice control device according to the recognized speech command and the detection output;
    wherein when the detection output indicates a first motion of the mobile device, the voice control device has a first response for the recognized speech command; and when the detection output indicates a second motion of the mobile device, the voice control device has a second response for the same recognized speech command, where the second motion is different from the first motion, and the second response is different from the first response.

2. The voice control device of claim 1, wherein the speech command recognizer includes a predefined command set which is consistently used during the speech command recognition, and determines the recognized speech command according to at least the predefined command set.

3. The voice control device of claim 1, wherein the at least one auxiliary sensor includes at least one of an accelerometer, an ambient temperature sensor, a gravity sensor, an ambient light sensor, and a Gyro sensor.

4. The voice control device of claim 1, wherein the sensor data processor is a motion detector arranged to perform motion detection according to the sensor data.

5. The voice control device of claim 4, wherein the motion detector comprises:
    an adaptive training unit, arranged to train at least one motion model by an adaptive training process;
    a storage unit, arranged to store the at least one motion model trained by the adaptive training unit; and
    a motion evaluation unit, arranged to determine the detection output according to the sensor data and the at least one motion model.

6. The voice control device of claim 5, wherein the adaptive training process is an explicit training process performed before the voice control device is in normal operation.

7. The voice control device of claim 5, wherein the adaptive training process is an implicit training process performed while the voice control device is in normal operation.

8. A voice control method performed by a mobile device, comprising:
    performing speech command recognition to output a recognized speech command;
    processing sensor data generated from at least one auxiliary sensor to determine a motion of a mobile device comprising the voice control device, to generate a detection output; and
    referring to the recognized speech command and the detection output to decide a response of voice control;

wherein when the detection output indicates a first motion of the mobile device, the voice control has a first response for the recognized speech command; and when the detection output indicates a second motion of the mobile device, the voice control has a second response for the same recognized speech command, where the second motion is different from the first motion, and the second response is different from the first response.

9. The voice control method of claim 8, wherein the step of performing the speech command recognition comprises:
   determining the recognized speech command according to at least a predefined command set which is consistently used during the speech command recognition.

10. The voice control method of claim 8, wherein the sensor data is received from the at least one auxiliary sensor, including at least one of an accelerometer, an ambient temperature sensor, a gravity sensor, an ambient light sensor, and a Gyro sensor.

11. The voice control method of claim 8, wherein the step of processing the sensor data comprises:
   performing motion detection according to the sensor data.

12. The voice control method of claim 11, further comprising:
   performing an adaptive training process to obtain at least one motion model;
   wherein the step of performing the motion detection comprises:
   determining the detection output according to the sensor data and the at least one motion model.

13. The voice control method of claim 12, wherein the adaptive training process is an explicit training process performed before the voice control is in normal operation.

14. The voice control method of claim 12, wherein the adaptive training process is an implicit training process performed while the voice control is in normal operation.

15. A non-transitory machine readable medium storing a program code, wherein when the program code is executed by a processor, the program code instructs the processor to perform following steps:
   performing speech command recognition to output a recognized speech command;
   processing sensor data generated from at least one auxiliary sensor to determine a motion of a mobile device comprising the voice control device, to generate a detection output; and
   referring to the recognized speech command and the detection output to decide a response of voice control;
   wherein when the detection output indicates a first motion of the mobile device, the voice control has a first response for the recognized speech command; and when the detection output indicates a second motion of the mobile device, the voice control has a second response for the same recognized speech command, where the second motion is different from the first motion, and the second response is different from the first response.

* * * * *